(12) United States Patent
Roth, II

(10) Patent No.: US 7,092,316 B2
(45) Date of Patent: Aug. 15, 2006

(54) TRANSDUCER GUARD FOR TROLLING MOTOR

(76) Inventor: Jan Justin Roth, II, 460 Old York Rd., Wellsville, PA (US) 17365

( * ) Notice: Subject to any disclaimer, the term of this patent is extended or adjusted under 35 U.S.C. 154(b) by 291 days.

(21) Appl. No.: 10/843,502

(22) Filed: May 11, 2004

(65) Prior Publication Data

US 2005/0254346 A1 Nov. 17, 2005

(51) Int. Cl.
*H01R 1/00* (2006.01)
(52) U.S. Cl. .................................... 367/188
(58) Field of Classification Search ............... 367/183, 367/173, 165, 188; 440/71, 72
See application file for complete search history.

(56) References Cited

U.S. PATENT DOCUMENTS

| 4,902,255 A | 2/1990 | Faunda |
| 6,168,483 B1 * | 1/2001 | McIntosh .................... 440/71 |
| 6,421,301 B1 | 7/2002 | Scanlon |

\* cited by examiner

*Primary Examiner*—Dan Pihulic
(74) *Attorney, Agent, or Firm*—Duane Morris LLP

(57) ABSTRACT

A guard is provided that protects sonar transducers attached to trolling motors from damage due to impact with underwater debris. The protective guard is mounted on the trolling motor in front of the sonar transducer.

24 Claims, 6 Drawing Sheets

TRANSDUCER GUARD FOR TROLLING MOTOR

FIELD OF THE INVENTION

The present invention generally relates to fishing equipment and more particularly, to the protection of underwater sonar transducers and other electronic devices that may be attached to trolling motors used on fishing boats.

BACKGROUND OF THE INVENTION

Electronic devices, such as sonar transducers, have long been used in the fishing arts for determining water depth and locating fish. For example, sonar transducers are often mounted to a bottom portion of a trolling motor on a boat so that a fisherman may gather sonar information at a particular location to be fished. Unfortunately, such underwater electronics devices are notoriously fragile in both their construction and methods of attachment to a trolling motor. Very often, it is the sonar transducer that first contacts submerged vegetation, rocks, stumps, or other debris, and the like. Weeds and grasses also often ensnare on the sonar transducer, causing it to malfunction. Impact upon rocks, stumps, underwater debris, heavy grass/weed beds, or with stream, river, or lake beds usually results in damage to the sonar transducer. Replacing several transducers over the course of a busy fishing season can make fishing an unnecessarily costly pastime.

Various devices have been suggested in the art for guarding trolling motors and sonar transducers. For example, U.S. Pat. No. 4,902,255 discloses a weed guard for attachment to electric trolling motors having a motor housing and a motor support shaft. The weed guard includes a lower frame member portion and an upper arm portion. The triangular frame portion has a flange for attachment to the motor housing so that the frame portion has one apex toward the front of the motor housing and extends downwardly and rearwardly from the apex with respect to the motor housing at a constant angle. The upper arm portion is secured to the frame portion at the apex, and extends upwardly and forwardly. A rearward extension member extends from the upper arm portion toward the motor shaft for attachment to the motor shaft. This weed guard is not compatible with the use of a sonar transducer, since the triangular frame portion extends the entire length of the bottom of the motor, and would therefore block the sonar transducer from either sending or receiving signals, rendering the transducer useless.

In U.S. Pat. No. 6,421,301, provides a protective slip-on cover for a motor mounted sonar. The cover slips over and surrounds the transducer on at least three sides, leaving the bottom surface open for the transmission and reception of sonar signals. Thus, after installation of the shield, the transducer is free to operate in its usual manner with no effect upon its acquisition of sonar data. Although this design offers some level of protection, it may not completely deflect impact forces, particularly shearing forces from impact of the transducer upon a rock or stump. It also does not appear to provide against hang-up on weeds and grasses.

None of the foregoing devices have proved to be wholly effective in protecting sonar transducers during normal use. As a consequence, there has been a long felt need for a sonar transducer guard with improved protection from damage resulting from underwater impacts with hard objects, such as stream and lake beds, debris, and the like, as well as protection from hang-up upon weeds and grasses.

SUMMARY OF THE INVENTION

The invention provides a transducer guard for a trolling motor including a motor mount having an outer surface and a sentry plate having a first end and a second end. The first end is fixedly fastened to a portion of the outer surface of the motor mount so that the sentry plate extends from the motor mount at an angle. A shield plate projects outwardly from the second end of the sentry plate and at an angle relative to the sentry plate so as to guard a vulnerable portion of a sonar transducer.

In another embodiment of the invention, a system for use in trolling for fish from a boat is provided including a trolling motor that is attached to a boat and a sonar transducer that is attached to the underside of a trolling motor. In order to prevent damage to the sonar transducer during trolling, a transducer guard is provided that includes a motor mount that is attached to the trolling motor. The transducer guard includes a sentry plate having a first end and a second end, where the first end is fixedly fastened to a portion of the motor mount so as to be in leading relation to the transducer. A shield plate projects outwardly from the second end of the sentry plate and at an angle relative to the sentry plate so as to be in overlying spaced relation to a portion of the sonar transducer.

In a further embodiment of the invention, a trolling motor having an integral sonar transducer guard is provided that includes a sentry plate having a first end and a second end, where the first end is integral with a portion of the trolling motor so that the sentry plate extends from the motor at a first angle. A shield plate projects outwardly from the second end of the sentry plate at a second angle so as to provide a guard for a later added transducer.

In yet a further embodiment of the invention, a protective guard for a sonar transducer that is attached to a trolling motor is provided including a sentry plate having a first end and a second end, where the first end is fixedly fastened to a portion of the trolling motor so as to be in leading relation to the transducer. The sentry plate is arranged so as to be at an angle relative to the trolling motor. A shield plate projects outwardly from the second end of the sentry plate so as to be in overlying spaced relation to a portion of a sonar transducer.

BRIEF DESCRIPTION OF THE DRAWINGS

These and other features and advantages of the present invention will be more fully disclosed in, or rendered obvious by, the following detailed description of the preferred embodiments of the invention, which are to be considered together with the accompanying drawings wherein like numbers refer to like parts and further wherein.

DETAILED DESCRIPTION OF THE PREFERRED EMBODIMENT

Figure 1:
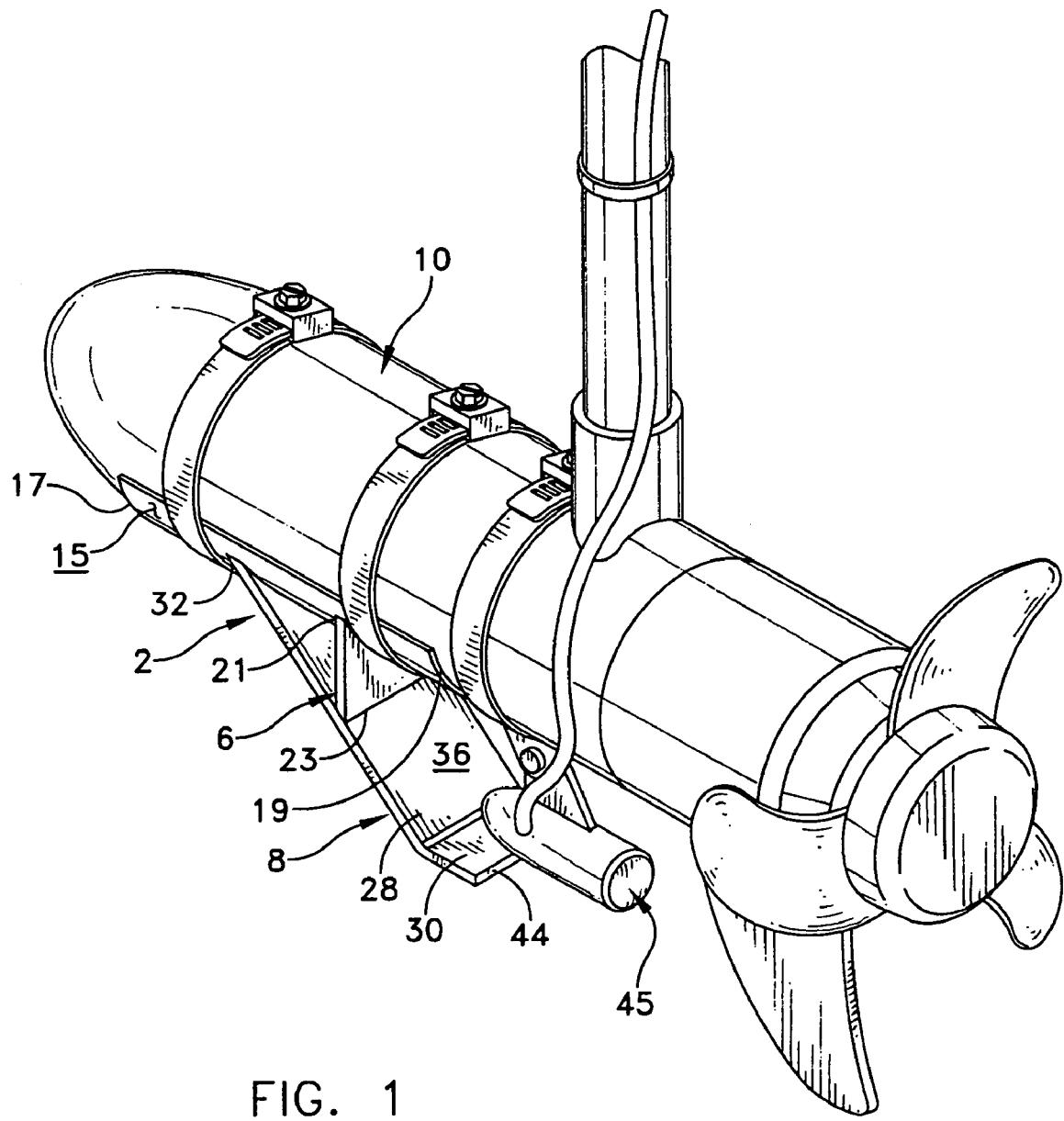
FIG. 1 is a perspective rear view of a transducer guard mounted on a typical trolling motor.

This description of preferred embodiments is intended to be read in connection with the accompanying drawings, which are to be considered part of the entire written description of this invention. The drawing figures are not necessarily to scale and certain features of the invention may be shown exaggerated in scale or in somewhat schematic form in the interest of clarity and conciseness. In the description, relative terms such as "horizontal," "vertical," "up," "down," "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, couping and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. In the claims, means-plus-function clauses are intended to cover the structures described, suggested, or rendered obvious by the written description or drawings for performing the recited function, including not only structural equivalents but also equivalent structures.

Figure 2:
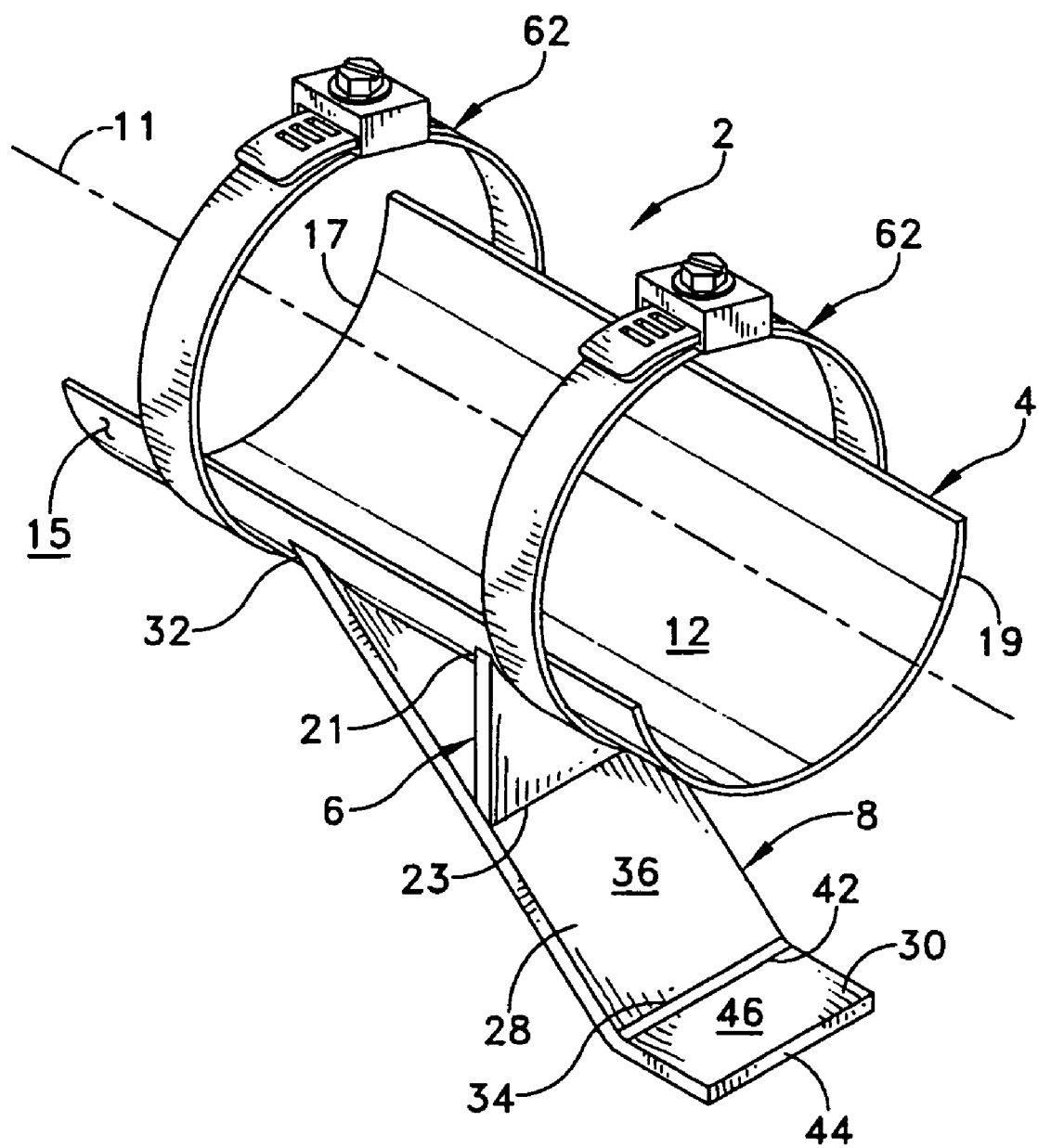
FIG. 2 is a perspective view of the transducer guard shown in FIG. 1.

Referring to FIGS. 1 and 2, a transducer guard 2 formed in accordance with one embodiment of the invention includes a motor mount 4, a brace 6 and a guard arm 8. Motor mount 4 often has a cross-sectional profile that is complementary to the general shape of a trolling motor 10, e.g., semicylindrical, rectilinear, or polygonal, and which may also include a longitudinal axis 11. In a preferred embodiment of the invention, motor mount 4 is semicylindrical in shape so as to receive a portion of a generally cylindrically shaped trolling motor 10 (FIGS. 1 and 3–6). Motor mount 4 comprises an mounting surface 12, an outer surface 15, a leading edge 17, and a trailing edge 19. Transducer guard 2 may be formed from any of the well known metals, polymers, or composite materials that are often used in marine applications, e.g., stainless steel, polyester, or carbon fiber reinforced fiber glass composite materials would all be suitable. In any event, transducer guard 2 may be constructed from any material that provides both rigidity and toughness sufficient to withstand the force transferred from impact with an underwater object at boat speeds from about one to about three miles per hour.

Figure 5:
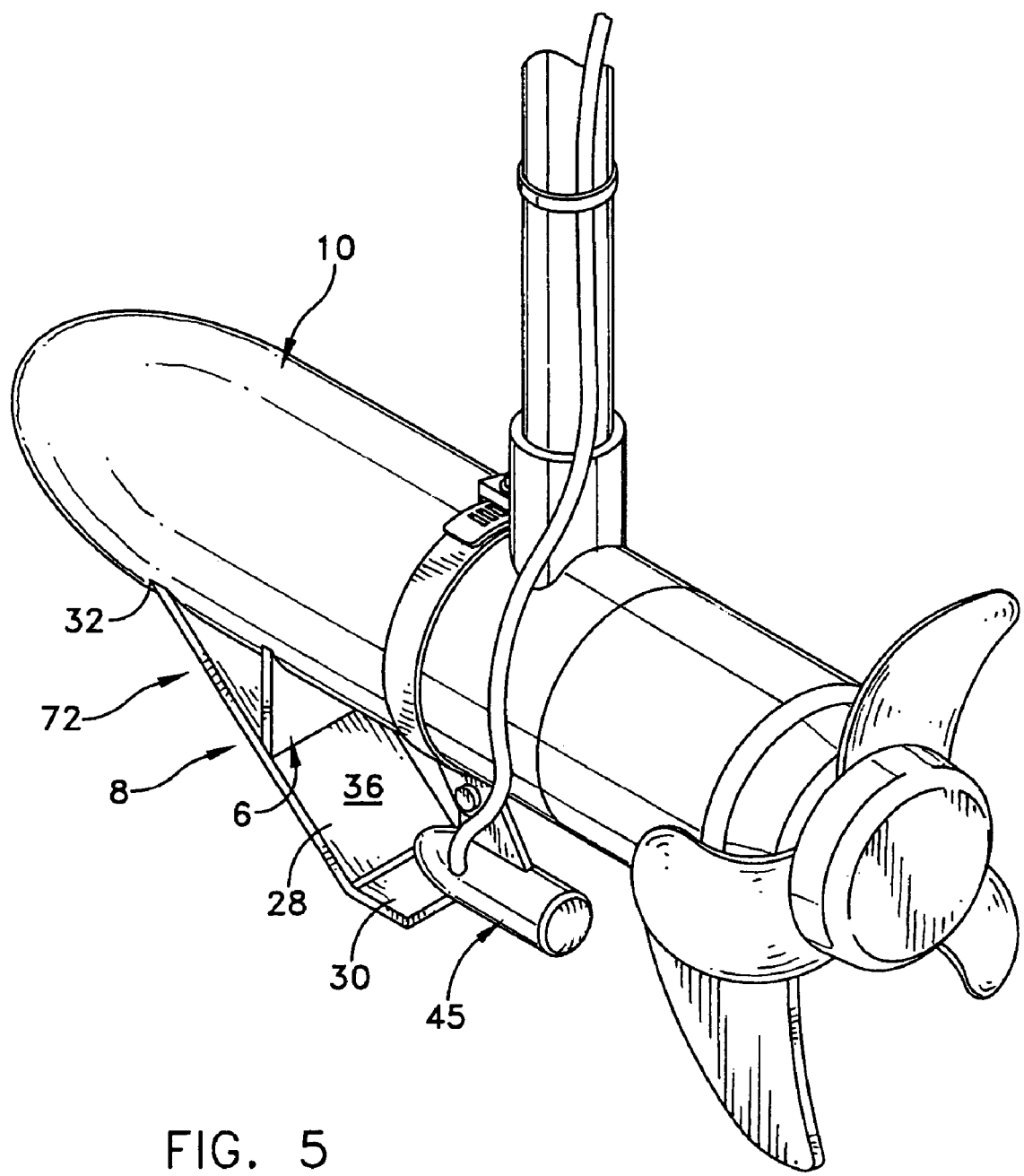
FIG. 5 is a perspective rear view of a trolling motor housing having an integrally formed transducer guard formed in accordance with an alternative embodiment of the invention.
Figure 6:
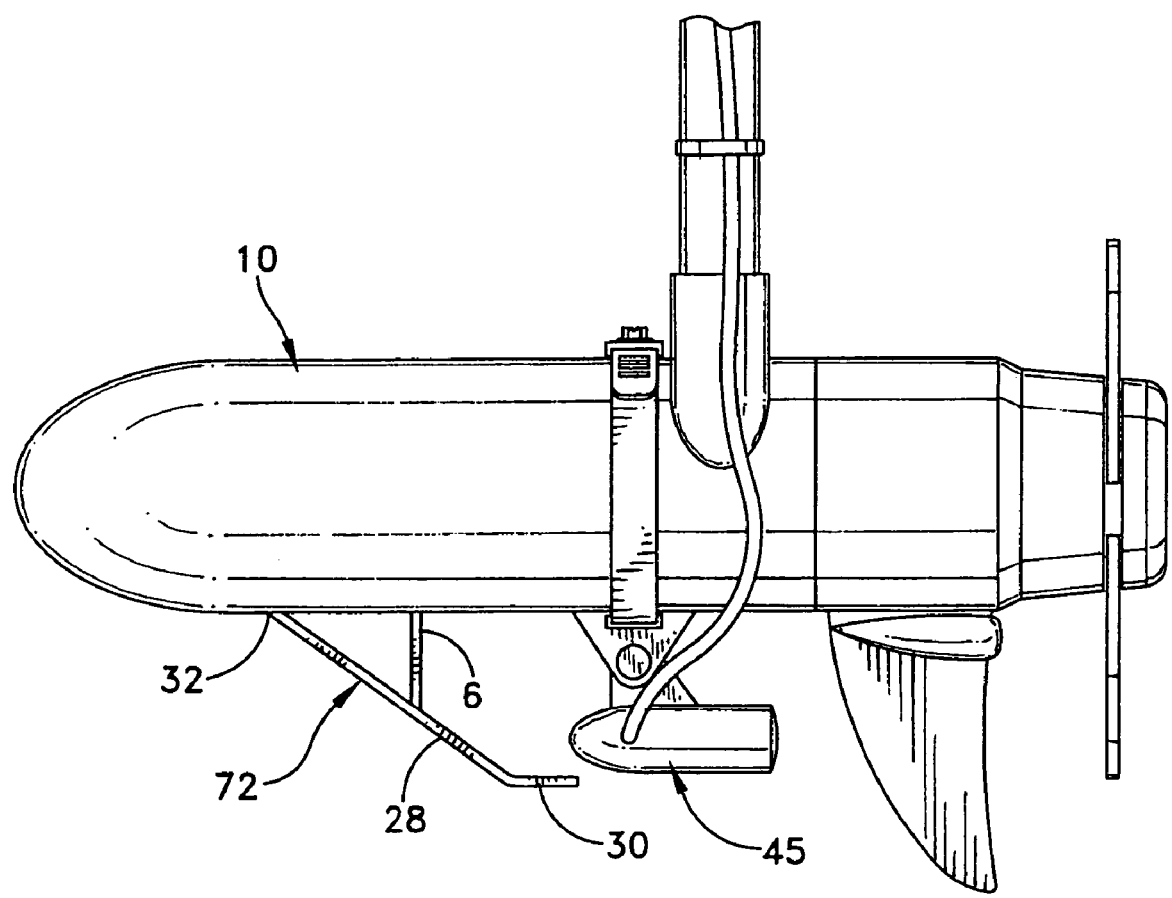
FIG. 6 is a side elevational view of the integral transducer guard shown in FIG. 5.

Brace 6 includes a first end 21 and a second end 23, and often comprises a plate that projects radially outwardly from a central portion of outer surface 15 of motor mount 4. First end 21 may be fixedly fastened to motor mount 4 by, e.g., welding or adhesives. Alternatively, brace 6 may be formed integrally with motor mount 4 (FIGS. 5 and 6).

Figure 3:
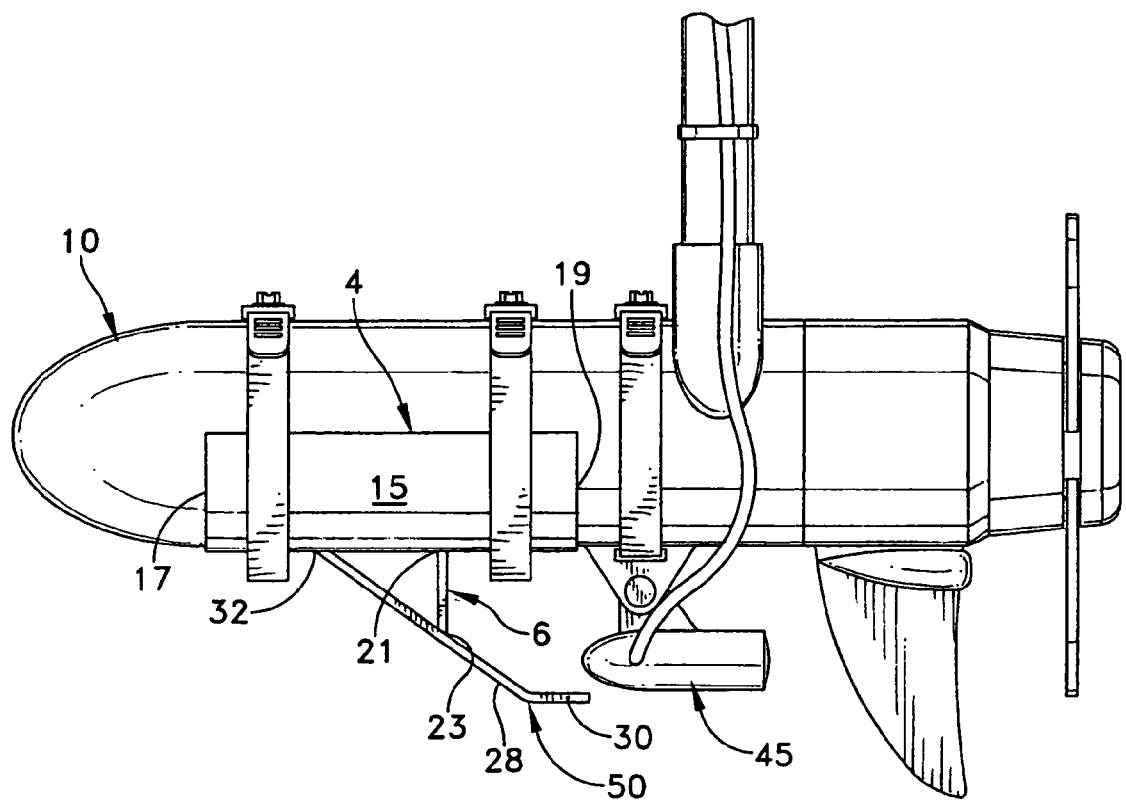
FIG. 3. is a side elevational view of the transducer guard mounted to a trolling motor shown in FIG. 1.

Guard arm 8 includes a sentry plate 28 and a shield plate 30. Sentry plate 28 has a leading end 32, a trailing end 34, and an inner surface 36. Leading end 32 is fixedly fastened to motor mount 4 by, e.g., welding or adhesives, so that guard arm 8 projects outwardly from outer surface 15 at an angle of between 15° and 45° relative to longitudinal axis 11 of motor mount 4, with 30° being preferred for most applications. Shield plate 30 includes leading end 42, a trailing end 44, and an inner surface 46. Leading end 42 of shield plate 30 is coextensive with trailing end 34 of sentry plate 28 such that shield plate 30 projects outwardly from trailing end 34 of sentry plate 28 at an angle relative to sentry plate 28. In one preferred embodiment the angle of shielded plate 30 relative to sentry plate 28 is such that shield plate 30 is arranged in substantially parallel relation to motor mount 4 and trolling motor 10. In this way, shield plate 30 projects outwardly and blow transducer 45 at a distance from transducer 45 sufficient to avoid interference with signal transmission or reception. Second end 23 of brace 6 is fixedly fastened to inner surface 36 of sentry plate 28 by, e.g., welding or adhesives, so as to provide structural support to sentry plate 28, and to prevent bending of sentry plate 28 toward motor mount 4. An outer edge 50 is formed at the intersection of leading end 42 of shield plate 30 and trailing end 34 of sentry plate 28 (FIGS. 2 and 3).

Transducer guard 2 may be mounted to a trolling motor 10 in protective relation to sonar transducer 45 in the following manner. Motor mount 4 is first oriented so that mounting surface 12 is arranged in parallel confronting relation to the outer surface of trolling motor 10. Once in this position, transducer guard 2 is moved toward trolling motor 10 until mounting surface 12 engages the outer surface of trolling motor 10. One or more releasable clamps 62 may then be positioned so as to releasably fastened transducer guard 2 to the outer surface of trolling motor 10. Alternatively, other conventional fasteners, such as, screws, bolts, clips, snaps or the like, may be used to mount transducer guard 2 to trolling motor 10 with similar effect. Prior to completion of the foregoing step, transducer guard 2 may be slid along the outer surface of trolling motor 10 so that inner surface 46 of shield plate 30 is disposed in overlying and confronting spaced relation to at least a portion of transducer 45 (FIG. 2). Once in this position, clamps 62 may be tightened so as to fixedly position transducer guard 2 on trolling motor 10. Transducer guard 2 is preferably mounted upstream/in front of sonar transducer 45 so that sentry plate 28 leads sonar transducer 45. It should be noted that shield plate 30 covers the leading portion of transducer 68 without obstructing the sonar signal path.

Figure 4:
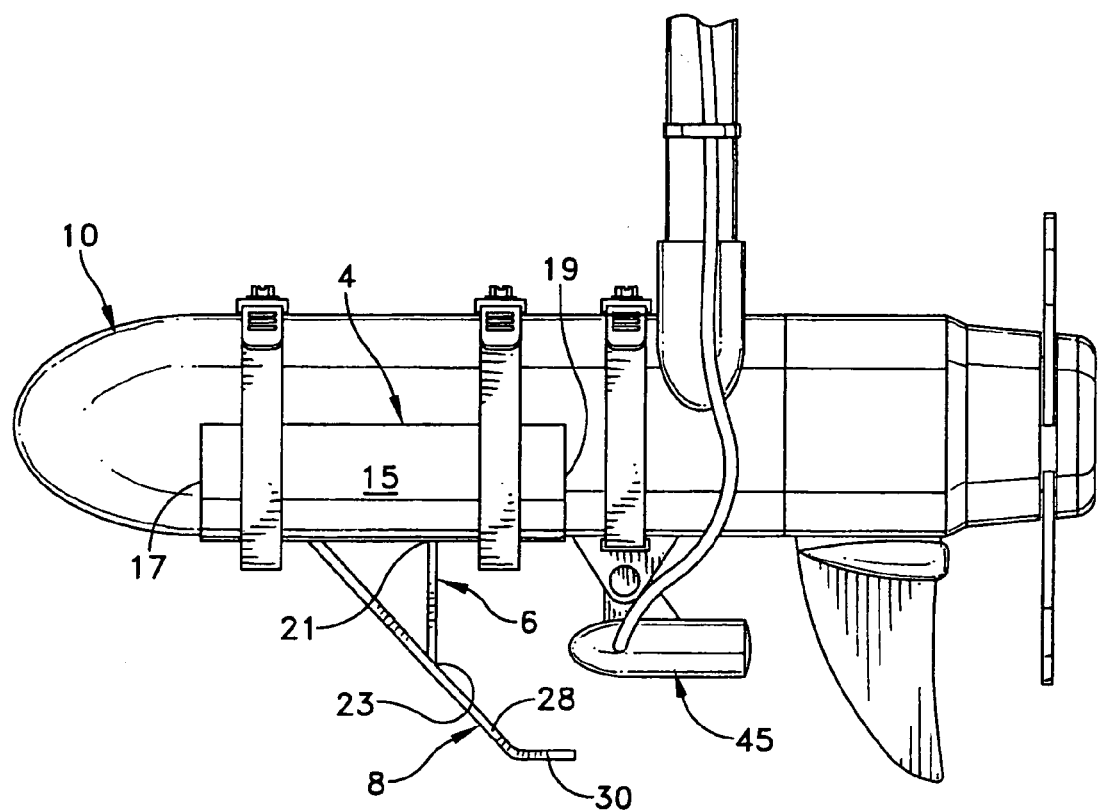
FIG. 4 is a side elevational view of a transducer guard mounted to a trolling motor showing another embodiment of the transducer guard.

Transducer guard 2 operates to protect a sonar transducer 45 in the following manner. As trolling motor 10 propels a boat (not shown) forward, sentry plate 28 moves through the water ahead of sonar transducer 45. Any obstacle encountered by assembled trolling motor 10, sonar transducer 45, and transducer guard 2 will first strike upon the outer surface of sentry plate 28. As this occurs, the angled orientation of sentry plate 28 relative to longitudinal axis 11 will cause the entire assembly (i.e., trolling motor 10, transducer guard 2, and sonar transducer 45) to move upwardly relative to the obstacle. Upon reaching outer edge 50 of guard arm 8, the obstacle will transition to sliding along the outer surface of shield plate 30. Shield plate 30 separates transducer 45 from the obstacle thereby protecting it from contact and subsequent damage as a result of impact with the obstacle. Guard arm 8 may comprise a sentry plate 28 of varying length so that shield plate 30 may be located close to or distant from sonar transducer 45 (FIGS. 3 and 4). In an alternative embodiment of the invention, transducer guard 72 is formed as an integral portion of trolling motor 10 (FIGS. 5 and 6). In this embodiment, leading edge 32 and guard arm 8 form an integral portion of the housing that encloses trolling motor 10. In other respects, transducer guard 72 is substantially similar to transducer guard 2.

ADVANTAGES OF THE INVENTION

Numerous advantages are obtained by employing the present invention. More specifically, a trolling motor mountable transducer guard is provided for the protection of sonar transducers which can be easily attached to the trolling motor, and which avoids many of the aforementioned problems associated with prior art devices.

Also, a transducer guard is provided that significantly improves protection from underwater impacts with hard objects, such as, stream and lake beds, underwater debris, and the like, as well as protection from hang-up in weeds and grasses.

In addition, a transducer guard is provided that is adapted to be mounted independently of a sonar transducer mounting band, and without modification of the trolling motor or sonar transducer.

Furthermore, a transducer guard is provided that can be configured to protect a wide variety of makes and models of sonar transducers. It is believed that the inventive transducer guard has almost universal application, and allows transom mounted transducers to be used.

It is to be understood that the present invention is by no means limited only to the particular constructions herein disclosed and shown in the drawings, but also comprises any modifications or equivalents within the scope of the claims.

What is claimed is:

1. A transducer guard for a trolling motor comprising:
a motor mount having an outer surface;
a sentry plate having a first end and a second end wherein said first end is fixedly fastened to a portion of said outer surface so that said sentry plate extends from said motor mount at an angle; and
a shield plate projecting outwardly from said second end of said sentry plate and at an angle relative to said sentry plate.

2. A transducer guard according to claim 1 wherein said motor mount has a semicylindrical shape.

3. A transducer guard according to claim 1 comprising a brace having (i) a first end fixedly fastened to said outer surface of said motor mount so that said brace projects radially outwardly, and (ii) a second end fixedly fastened to said sentry plate.

4. A transducer guard according to claim 1 wherein said sentry plate has a leading end fixedly fastened to motor mount so that said sentry plate projects outwardly from said outer surface of said motor mount at an angle of between 15° and 45° and a trailing end positioned in spaced relation to said leading end.

5. A transducer guard according to claim 4 wherein said shield plate includes a leading end, a trailing end, an inner surface and an outer surface so that said leading end is coextensive with said trailing end of said sentry plate whereby said shield plate projects outwardly from said trailing end of said sentry plate so as to be arranged in substantially parallel relation to said motor mount.

6. A transducer guard according to claim 3 wherein said second end of said brace is fixedly fastened to an inner surface of said sentry plate so as to provide structural support and prevent bending of said sentry plate toward said motor mount.

7. A transducer guard according to claim 5 wherein an outer edge is formed at an intersection of said leading end of said shield plate and said trailing end of said sentry plate.

8. A system for use in trolling for fish from a boat comprising in combination:
a trolling motor attached to a boat;
a sonar transducer attached to said trolling motor;
a transducer guard comprising a motor mount attached to an underside of said trolling motor;
a sentry plate having a first end and a second end wherein said first end is fixedly fastened to a portion of said motor mount so as to be in leading relation to said transducer; and
a shield plate projecting outwardly from said second end of said sentry plate and at an angle relative to said sentry plate so as to be in overlying spaced relation to a portion of said sonar transducer.

9. A system according to claim 8 wherein said transducer guard is mounted independently of said sonar transducer.

10. A system according to claim 8 wherein said transducer guard is mounted in front of said sonar transducer.

11. A system according to claim 8 wherein said transducer guard comprises a semicylindrical motor mount.

12. A system according to claim 11 wherein said motor and said motor mount comprise a semicylindrical shape.

13. A system according to claim 8 comprising a brace having (i) a first end fixedly fastened to said outer surface of said motor mount so that said brace projects radially outwardly, and (ii) a second end fixedly fastened to said sentry plate.

14. A system according to claim 8 wherein said sentry plate has a leading end fixedly fastened to motor mount so that said sentry arm projects outwardly from said outer surface of said motor mount at an angle of between 15° and 45° and a trailing end positioned in spaced relation to said leading end.

15. A system according to claim 8 wherein said shield plate includes a leading end, a trailing end, an inner surface and an outer surface so that said leading end is coextensive with said trailing end of said sentry plate whereby said shield plate projects outwardly from said trailing end of said sentry plate so as to be arranged in substantially parallel relation to said motor mount.

16. A system according to claim 8 wherein said second end of said shield plate is fixedly fastened to an inner surface of said sentry plate so as to provide structural support and prevent bending of said sentry plate toward said motor mount.

17. A system according to claim 8 wherein an outer edge is formed at an intersection of said leading end of said shield plate and said trailing end of said sentry plate.

18. A trolling motor having an integral sonar transducer guard comprising:
a sentry plate having a first end and a second end wherein said first end is integral with a portion of said trolling motor so that said sentry plate extends from said motor at a first angle; and
a shield plate projecting outwardly from said second end of said sentry plate at a second angle.

19. A trolling motor according to claim 18 comprising a brace having (i) a first end fixedly fastened to said outer surface of said motor so that said brace projects radially outwardly, and (ii) a second end fixedly fastened to said sentry plate.

20. A trolling motor according to claim 18 wherein said sentry plate has a leading end fixedly fastened to said motor so that said sentry plate projects outwardly from an outer surface of said motor at an angle of between 15° and 45° and a trailing end positioned in spaced relation to said leading end.

21. A trolling motor according to claim 20 wherein said shield plate includes a leading end, a trailing end, an inner surface and an outer surface so that said leading end is coextensive with said trailing end of said sentry plate whereby said shield plate projects outwardly from said trailing end of said sentry plate so as to be arranged in substantially parallel relation to said motor.

22. A trolling motor according to claim 21 wherein said second end of said shield plate is fixedly fastened to an inner surface of said sentry plate so as to provide structural support and prevent bending of said sentry plate toward said motor.

23. A trolling motor according to claim 22 wherein an outer edge is formed at an intersection of said leading end of said shield plate and said trailing end of said sentry plate.

24. A protective guard for a sonar transducer that is attached to a trolling motor comprising:
    a sentry plate having a first end and a second end wherein said first end is fixedly fastened to a portion of said trolling motor so as to be in leading relation to said transducer and arranged so as to be at an angle relative to said trolling motor; and
    a shield plate projecting outwardly from said second end of said sentry plate so as to be in overlying spaced relation to a portion of a sonar transducer.

* * * * *